C. M. LEECH.
VEHICLE SPRING.
APPLICATION FILED JAN. 30, 1911.

1,007,120.

Patented Oct. 31, 1911.

2 SHEETS—SHEET 1.

Witnesses
J. Milton Jester
B. P. Hinhuburn

Inventor
Charles M. Leech

By C. L. Parker
Attorney

C. M. LEECH.
VEHICLE SPRING.
APPLICATION FILED JAN. 30, 1911.

1,007,120.

Patented Oct. 31, 1911.

2 SHEETS—SHEET 2.

Witnesses
J. Milton Jester
B. F. Kirkburn

Inventor
Charles M. Leech

By C. L. Parker
Attorney

UNITED STATES PATENT OFFICE.

CHARLES M. LEECH, OF LIMA, OHIO.

VEHICLE-SPRING.

1,007,120.	Specification of Letters Patent.	Patented Oct. 31, 1911.

Application filed January 30, 1911. Serial No. 605,442.

*To all whom it may concern:*

Be it known that I, CHARLES M. LEECH, a citizen of the United States, residing at Lima, in the county of Allen and State of Ohio, have invented certain new and useful Improvements in Vehicle-Springs, of which the following is a specification.

My invention relates to vehicle springs, designed for use in connection with automobiles or the like.

An important object of this invention is to provide a vehicle spring of simple construction, which is highly capable of absorbing all primary and rebound shocks transmitted to an automobile or the like.

A further object of this invention is to provide a spring of the above character, which is strong, durable and not liable to derangements.

Other objects and advantages of this invention will be apparent during the course of the following description.

Figure 1:
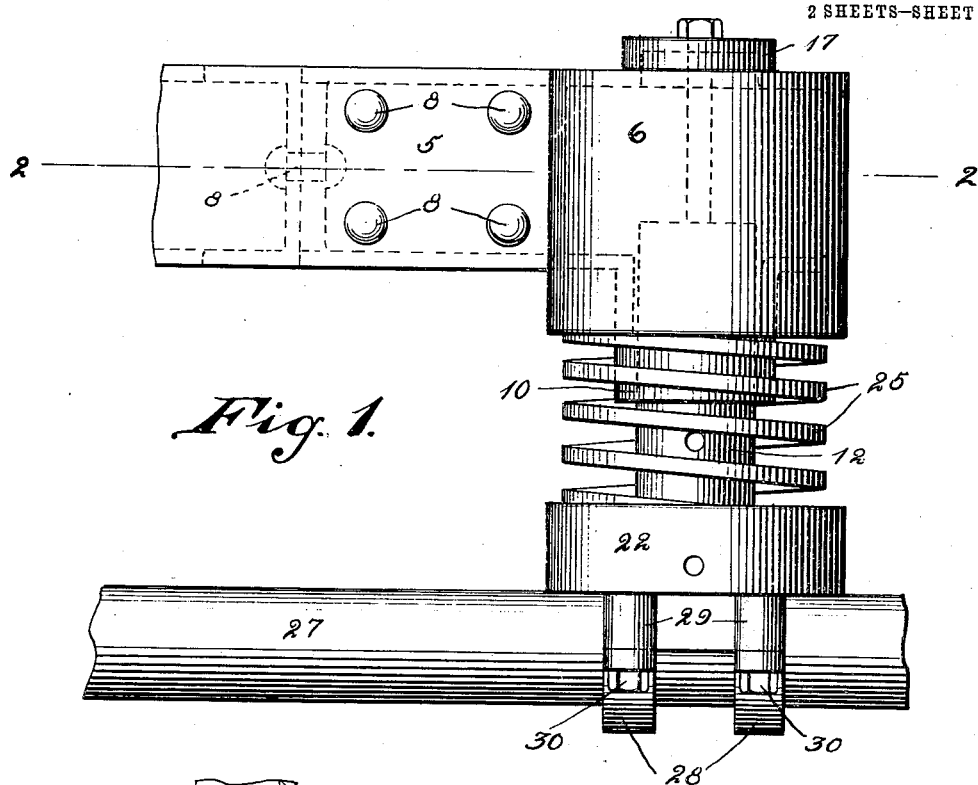
Figure 2:
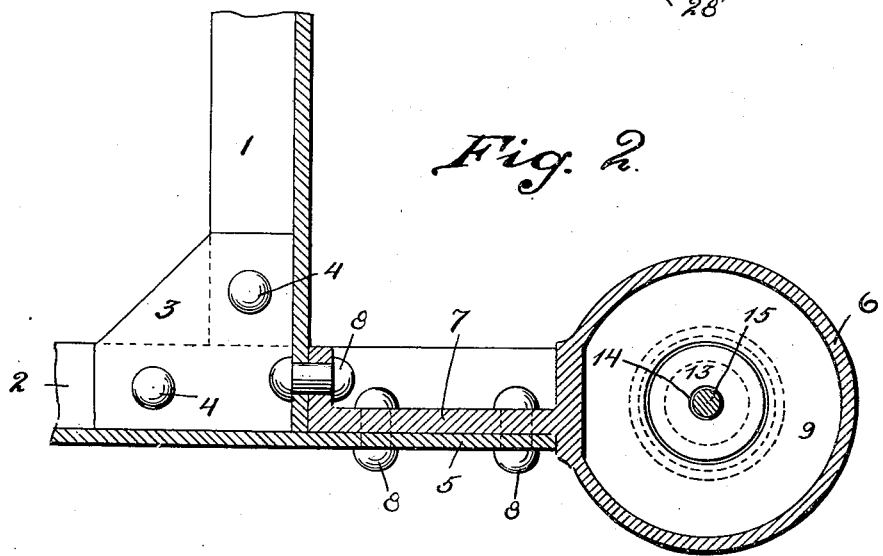
Figure 3:
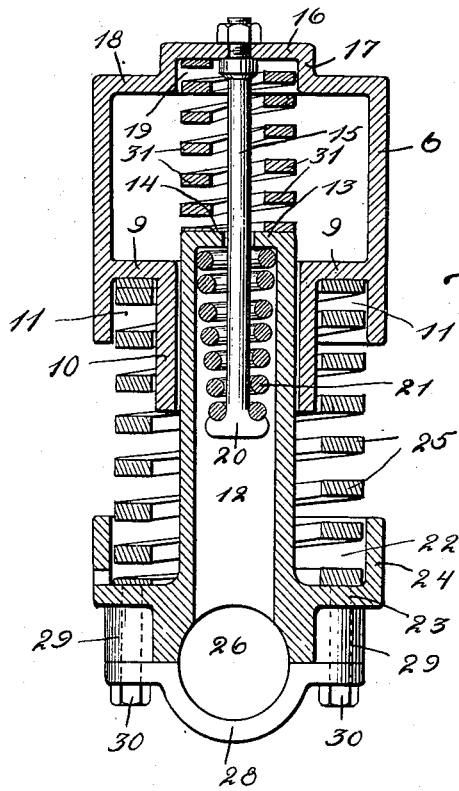
Figure 4:
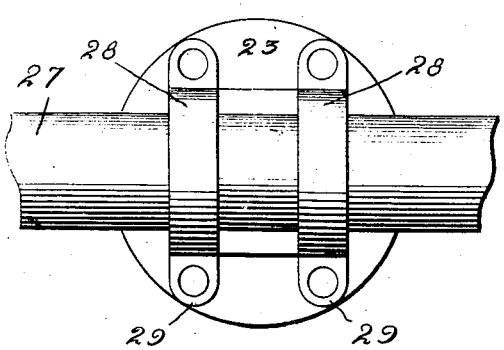

In the accompanying drawings forming a part of this specification, and in which like numerals are employed to designate like parts throughout the same, Figure 1 is a side view of my vehicle spring structure. Fig. 2 is a horizontal sectional view taken on line 2—2 of Fig. 1. Fig. 3 is a central vertical sectional view taken through the spring structure. Fig. 4 is a bottom plan view of the spring structure.

In the drawings wherein is illustrated a preferred embodiment of my invention, one corner of a vehicle frame is shown, comprising longitudinal and transverse beams 1 and 2, respectively. These beams are connected by a plate 3, which is bolted or otherwise secured to the frame, as shown at 4. The transverse beam 2 runs laterally beyond the beam 1, to form an extension 5.

Disposed near each corner of the frame of the vehicle, is a preferably cylindrical casing 6, provided with an arm 7, which is preferably formed integral therewith, as shown. This arm is bolted to the beams 1 and 2, as shown at 8. The lower end of the casing 6 is formed open, as shown, and said casing is provided near such lower end with an inwardly extending horizontal annular flange 9, from which depends a preferably cylindrical tube 10. This tube extends below the lower end of the casing 6, forming therewith an annular space 11. Longitudinally movably mounted within the depending tube 10 is a vertical tube 12, having its upper end closed by a wall or cap 13, provided with an opening 14 formed therethrough. The opening 14 loosely receives a vertical pin 15, which is rigidly connected with a preferably circular wall 16, as shown. The wall 16 is formed upon an annular flange 17, which is formed integral with and extends upwardly from the upper closed end 18 of the casing 6. The flange 17 forms an internal recess 19, for a purpose to be described. The lower end of the pin 15 is provided with a head 20, engaging a compressible coil spring 21. This coil spring surrounds the lower portion of the pin 15 and engages the wall or cap 13. The tube 12 is provided near its lower end with a socket 22, comprising horizontal and vertical flanges 23 and 24, respectively, which are preferably cast integral with said tube, as shown. A compressible coil spring 25 surrounds the tubes 10 and 12 and has its upper and lower ends disposed respectively, within the recess or socket 11 and the socket 22.

The lower end of the tube 12 is provided with a curved recess 26, for the reception of an axle 27. This axle is held in place by pairs of clamps 28, which are connected with pairs of ears 29, by bolts 30. The ears 29 may preferably be cast integral with the tube 12 and flange 23.

A compressible coil spring 31 surrounds the upper portion of the pin 15, the upper end of said spring fitting within the recess 19 and the lower end thereof engaging the wall or cap 13, as shown.

In the operation of the spring structure, the vehicle frame being supported by the casing 6 and the tube 12 by the axle 27, all primary shocks will be absorbed by the large coil spring 25. The shocks of rebound will be absorbed by the coil spring 21. The coil spring 31 aids the spring 25 in absorbing the primary shocks.

I wish it understood that the form of my invention herewith shown and described, is to be taken as a preferred example of the same, and that certain changes in the shape, size and arrangement of parts, may be resorted to without departing from the spirit of my invention or the scope of the subjoined claims.

Having thus described my invention, I claim:—

1. In a device of the character described, a casing provided with a depending tube, a second tube slidably mounted within the first named tube, a coil spring surrounding said tubes, a pin connected with said casing and extending within the second tube, and springs surrounding said pin above and below the upper end of said second tube.

2. In a device of the character described, a casing provided interiorly thereof with a depending tube having a less area in cross-section than said casing, to form a space between said tube and casing, a second tube for insertion within the first named tube and provided near its lower end with a socket, a spring surrounding said tubes and having its ends disposed within the socket and space, a pin connected with said casing and extending within the second named tube, and a spring to be compressed by said pin and having engagement with the upper portion of the second named tube.

3. In a device of the character described, a tube, means to attach the same to the axle of a vehicle, a second tube slidably mounted upon the exterior of the first named tube, a compressible coil spring surrounding the first named tube to oppose the longitudinal movement of the second named tube in one direction, the first named tube having its upper end formed partially closed, a compressible coil spring disposed within the first named tube and within the first named spring, and means connected with the second named tube including a pin, to compress the second named spring upon the longitudinal movement of the second named tube in one direction.

In testimony whereof I affix my signature in presence of two witnesses.

CHARLES M. LEECH.

Witnesses:
W. A. RISLIN,
CLARENCE C. MILLER.